No. 658,948. Patented Oct. 2, 1900.
N. B. GREGG.
METHOD OF EXTRACTING OIL.
(Application filed Feb. 21, 1900.)
(No Model.)
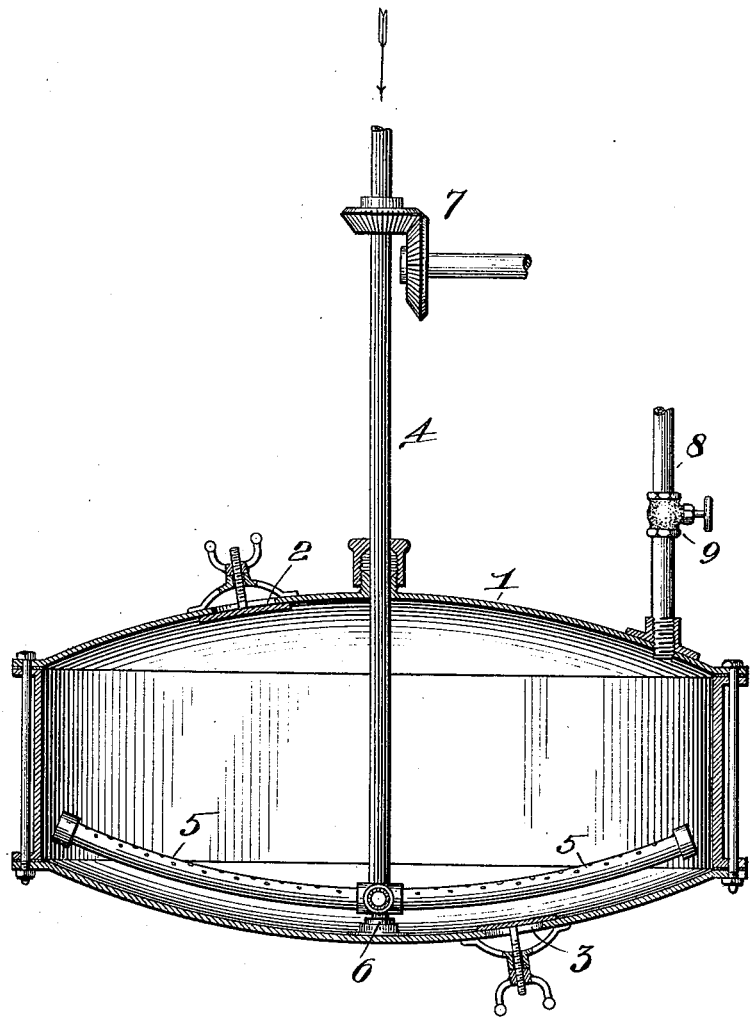
Inventor:
Norris B. Gregg:—
By Knight Bro
Atty's:—

UNITED STATES PATENT OFFICE.

NORRIS B. GREGG, OF ST. LOUIS, MISSOURI.

METHOD OF EXTRACTING OIL.

SPECIFICATION forming part of Letters Patent No. 658,948, dated October 2, 1900.

Application filed February 21, 1900. Serial No. 5,992. (No specimens.)

*To all whom it may concern:*

Be it known that I, NORRIS B. GREGG, a citizen of the United States, residing at the city of St. Louis, in the State of Missouri, have invented certain new and useful Improvements in Methods of Extracting Oil or Grease from Oily or Fatty Materials, of which the following is a full, clear, and exact description, reference being had to the accompanying drawing, forming part of this specification.

My invention relates to a method of extracting oil or grease from materials such as oleaginous seeds or nuts or fatty materials in which the sacks or cells are broken to release the contents thereof.

The essential feature of my method consists in placing the materials to be treated in a closed receptacle and extracting the air therefrom, to thus create a vacuum, under which the oil or grease may be freed from the sacks or cells by reason of the exterior pressure of air thereagainst being relieved, so that the sacks or cells burst as a result of the pressure from the interior to the exterior thereof.

In carrying out my method any suitable apparatus may be used.

In the accompanying drawing I have shown a vertical sectional view of the apparatus such as I may utilize.

1 designates a vacuum-pan provided with an inlet-manhole 2 and a discharge-manhole 3.

4 designates the hollow shaft through which hot air, steam, or water may be admitted to the interior of the vacuum-pan, the shaft being provided with perforated arms 5 and seated in a bearing 6 in the bottom of the pan. The said shaft passes through the wall of the vacuum-pan and is adapted to be rotated by gearing such as that designated at 7, so that the perforated arms 5 may be moved within the pan.

8 designates a pipe provided with a valve 9. This pipe is designed for use in extracting the air from the interior of the vacuum-pan to produce a vacuum therein.

In the extracting operation the material from which the oil or grease is to be extracted is placed in the vacuum-pan and the air is withdrawn from said pan through the pipe 8, thereby relieving the oil or grease containing sacks or cells from pressure of air thereagainst, so that the force of the contents of the sacks or cells bursts them open to release the oily or fatty material. In some instances it may be advisable to supply heat or moisture to the material under treatment and also to agitate it, and to this end I make use of the hollow shaft 4, having perforated arms 5, through which hot air, steam, or water may be conveyed into the vacuum-pan. This shaft being rotated, the hot air, steam, or water is effectually commingled with the material under treatment, so that such material is heated or softened to a desirable extent before the air is extracted from the vacuum-pan to place the material under the vacuum. After the material has been heated or softened the hot air or steam may be extracted in the step of extracting the air from the vacuum-pan and creating a vacuum, or the steam or water introduced may be removed in any other suitable manner—such, for instance, as by withdrawing it through the perforated arms 5 and hollow shaft 4 by a suitable pump arranged in communication therewith. By a "vacuum" I mean a condition as near as possible to a complete vacuum.

My method is of utility in treating oily and fatty material of various descriptions, such as oleaginous seeds or nuts and animal fats; but it is particularly for use in extracting oil from seeds, such as linseed, cotton-seed, or other oleaginous seeds and nuts. Where the material being treated is oleaginous seeds or nuts or like products, the material is first ground or crushed to break its shells or hulls and expose the oil sacks or cells. After the material has been subjected to the vacuum in the manner herein described and the sacks or cells containing the oil or grease have been opened as explained the material is removed from the vacuum-pan and placed in a pressure-press or percolating apparatus of any ordinary description to expel the oil or grease from the mass.

I claim as my invention—

1. The method of extracting oil or grease from oily or fatty materials consisting in placing the material in a receptacle and extracting the air from said receptacle to produce a vacuum therein and cause the oil sacks or cells to open, substantially as described.

2. The method of extracting oil or grease from oily or fatty materials consisting in placing said material in a receptacle, subjecting the material while in said receptacle to heat or moisture, and subsequently extracting the air from said receptacle to create a vacuum therein under which the oil sacks or cells are caused to burst, substantially as described.

3. The method of extracting oil or grease from oily or fatty materials consisting in placing said material in a receptacle, injecting hot air or moisture into said receptacle and to agitating the material and subsequently extracting the air and moisture from said receptacle thereby creating a vacuum therein, substantially as described.

NORRIS B. GREGG.

In presence of—
  E. S. KNIGHT,
  N. V. ALEXANDER.